United States Patent
Lai et al.

(10) Patent No.: US 9,584,845 B2
(45) Date of Patent: Feb. 28, 2017

(54) LIVE SYSTEM, METHOD BASED ON MOBILE TERMINAL AND MOBILE TERMINAL

(71) Applicant: TENCENT TECHNOLOGY (SHENZHEN) COMPANY LIMITED, Shenzhen (CN)

(72) Inventors: Jing Lai, Shenzhen (CN); Zhidong Zhang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/851,635

(22) Filed: Sep. 11, 2015

(65) Prior Publication Data

US 2016/0007067 A1  Jan. 7, 2016

Related U.S. Application Data (63) Continuation of application No. PCT/CN2014/073277, filed on Mar. 12, 2014.

(30) Foreign Application Priority Data

Mar. 13, 2013  (CN) .......................... 2013 1 0080131

(51) Int. Cl.
 *H04N 21/41* (2011.01)
 *H04N 21/2187* (2011.01)
 (Continued)

(52) U.S. Cl.
 CPC ..... *H04N 21/4126* (2013.01); *H04N 21/2187* (2013.01); *H04N 21/2743* (2013.01);
 (Continued)

(58) Field of Classification Search
 None
 See application file for complete search history.

(56) References Cited

U.S. PATENT DOCUMENTS

| | | | | |
|---|---|---|---|---|
| 2011/0306325 | A1* | 12/2011 | Gutta | H04N 7/148 455/414.1 |
| 2013/0007788 | A1* | 1/2013 | Levinson | H04N 7/18 725/13 |
| 2014/0056574 | A1* | 2/2014 | Mostoufi | G11B 27/02 386/278 |

FOREIGN PATENT DOCUMENTS

| | | |
|---|---|---|
| CN | 101340556 A | 1/2009 |
| CN | 101674476 | 3/2010 |
| CN | 102811368 A | 12/2012 |

OTHER PUBLICATIONS

International Preliminary Report on Patentability for Application No. PCT/CN2014/073277 dated Sep. 24, 2015.
(Continued)

*Primary Examiner* — Omar S Parra
(74) *Attorney, Agent, or Firm* — Harness, Dickey & Pierce, P.L.C.

(57) ABSTRACT

A live broadcast system for use with a mobile terminal and a mobile terminal is described. The system includes a mobile terminal and a live server. The mobile terminal collects a video signal and an audio signal, compresses the video signal and the audio signal, packages the compressed video signal and the compressed audio signal into a data stream, and transmits the data stream to a live server. The live server transmits the data stream to a terminal device, wherein the data stream can be directly played in the terminal device. Thus, the cost of live broadcasts is reduced.

11 Claims, 3 Drawing Sheets

(51) Int. Cl.
    *H04N 21/2743*     (2011.01)
    *H04N 21/414*     (2011.01)
    *H04N 21/4223*     (2011.01)
    *H04W 4/06*     (2009.01)
    *H04W 4/22*     (2009.01)
    *H04N 21/439*     (2011.01)
    *H04N 21/44*     (2011.01)
    *H04N 21/61*     (2011.01)
    *H04N 21/4788*     (2011.01)

(52) U.S. Cl.
    CPC ... *H04N 21/41407* (2013.01); *H04N 21/4223* (2013.01); *H04N 21/439* (2013.01); *H04N 21/44* (2013.01); *H04N 21/6181* (2013.01); *H04W 4/06* (2013.01); *H04W 4/22* (2013.01); *H04N 21/4788* (2013.01)

(56) References Cited

OTHER PUBLICATIONS

International Search Report for Application No. PCT/CN2014/073277 dated Jun. 30, 2014.

\* cited by examiner

LIVE SYSTEM, METHOD BASED ON MOBILE TERMINAL AND MOBILE TERMINAL

CROSS-REFERENCE TO RELATED APPLICATIONS

This application is a continuation of International Application No. PCT/CN2014/073277, filed Mar. 12, 2014. This application claims the benefit and priority of Chinese Application No. 201310080131.0, filed Mar. 13, 2013. The entire disclosures of each of the above applications are incorporated herein by reference.

FIELD

The present disclosure relates to a live system, method based on a mobile terminal and a mobile terminal.

BACKGROUND

This section provides background information related to the present disclosure which is not necessarily prior art.

Presently, live systems are usually based on televisions or networks. In live systems, professional studio cameras and large studio vehicles collect audio signals and video signals. Designated networks or satellite transmission circuits are used for transmitting the collected audio signals and the video signals. The collected audio signals and the video signals are then transmitted to television systems or network systems.

SUMMARY

This section provides a general summary of the disclosure, and is not a comprehensive disclosure of its full scope or all of its features.

A live system, method based on a mobile terminal and a mobile terminal are provided according to various embodiments of the present disclosure, so as to reduce live cost.

A system for performing a live broadcast based on a mobile terminal includes:

a mobile terminal, to collect a video signal and an audio signal, compress the video signal and the audio signal, package the compressed video signal and the compressed audio signal into a data stream, and transmit the data stream to a live server; and the live server, to transmit the data stream to a terminal device, wherein the data stream can be directly played in the terminal device.

A method for performing a live broadcast based on a mobile terminal includes:

collecting, by a mobile terminal, a video signal and an audio signal;

compressing, by the mobile terminal, the video signal and the audio signal;

packaging, by the mobile terminal, the compressed video signal and the compressed audio signal into a data stream; and transmitting, by the mobile terminal, the data stream to a live server, wherein the data stream can be directly played in a terminal device to receive the data stream from the live server.

A mobile terminal includes:

a processor for executing instructions stored in a memory, the instructions comprise:

a first collecting instruction, to collect a video signal;

a second collecting instruction, to collect an audio signal;

a first compressing instruction, to compress the video signal;

a second compressing instruction, to compress the audio signal; and a packaging instruction, to package the video signal compressed through the first compressing instruction and the audio signal compressed through the second compressing instruction into a data stream; and a transmitting instruction, to transmit the data stream to a live server, wherein the data stream can be directly played in a terminal device to receive the data stream from the live server.

According various embodiments, a mobile terminal collects a video signal and an audio signal, compresses the video signal and the audio signal, packages the compressed video signal and the compressed audio signal into a data stream, and transmits the data stream to a live server. The live server transmits the data stream to a terminal device, wherein the data stream can be directly played in the terminal device. Thus, a live broadcast can be performed based on the mobile terminal. Since professional studio cameras and large studio vehicles are not configured for a live broadcast, cost of the live broadcast is reduced. Moreover, since mobile terminals are portable and widely distributed, the real-time requirement for live broadcasts in the cases of emergencies are fulfilled.

Moreover, the mobile terminal packages the compressed video signal and the compressed audio signal into a data stream and transmits the data stream to a live server. Since the data stream can be directly played in a terminal device, the live server does not need to process the data stream from the mobile terminal and can directly transmit the data stream to a terminal device. Thus, overload of the live server is reduced, time delay of live broadcasts is reduced, and real time of live broadcasts is improved.

Further areas of applicability will become apparent from the description provided herein. The description and examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Live systems based on televisions and networks consume considerable manpower and material resources. Thus, the cost of a live broadcast is high. Moreover, since professional studio cameras and large studio vehicles have to be configured in event scenes, the live systems based on the televisions and the networks can not satisfy the real-time requirement for live broadcasts in the cases of emergencies.

Figure 1:
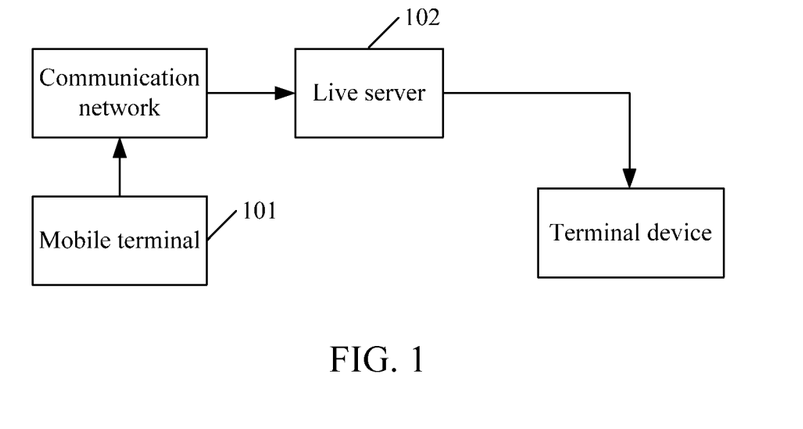
FIG. 1 is a diagram illustrating a structure of a live system based on a mobile terminal according to various embodiments.

FIG. 1 is a diagram illustrating a structure of a live system based on a mobile terminal according to various embodiments of the present disclosure. As shown in FIG. 1, the system includes a mobile terminal 101 and a live server 102. The mobile terminal 101 collects a video signal and an audio signal and compresses the two signals. The mobile terminal 101 activates a camera to collect the video signal and activates a microphone to collect the audio signal. The mobile terminal 101 packages the compressed video signal and the compressed audio signal into a live data stream and transmits the live data stream to the live server 102. The mobile terminal 101 transmits the live data stream to the live server 102 via a communication network, e.g., a wireless network, the Internet. The live server 102 distributes the living data stream to a terminal device. The terminal device may include a mobile terminal, such as a smartphone, and may also include an immobile terminal device, such as a television or a personal computer (PC).

According to various embodiments, the mobile terminal 101 collects uncompressed audio PCM data through a microphone and obtains a compressed audio frame of a format (e.g., MP3, acc) through compression encoding. The mobile terminal 101 collects uncompressed video data through the camera and obtains a compressed video frame of a format (e.g., H.264, H.263, MPEG4) through a video compressing chip in the mobile terminal 101. The mobile terminal 101 multiplexes the compressed audio frame and the compressed video frame including customized information, e.g., a subtitle, a geographical position with a format e.g., FLV, TS, RTP, or a customized format. The live data stream generated following the multiplexing process above is transmitted to the live server 102 via a network, e.g., 3G, Wi-Fi, 4G.

The live server 102, after receiving data (e.g. the living data stream) transmitted from the mobile terminal 101, transmits the data to a terminal device via a content distribution network (CDN). The live server 102 further stores the data from the mobile terminal 101 as a file with a designated format, e.g., an FLV file or a MP4 file. In an on demand or similar other scenarios, the live server 102 further transmits the data to the terminal device.

The mobile terminal 101 packages the compressed video signal and the compressed audio signal into a living data stream. More particularly, the mobile terminal 101 packages the compressed video signal and the compressed audio signal into the living data stream with a FLV format. Because a live data stream in the FLV format is desirable, the live server 102 and the CDN network can distribute the data stream to a live terminal device rather than processing the living data stream with the FLV format. Thus, overload of the live server 102 and the CDN network is avoided, and real time of a live broadcast is enhanced. Moreover, the data stream with the FLV format can be played in the live terminal device without the requirement of installing a plug-in unit.

The mobile terminal 101 may compress the video signal to obtain a data stream with a H.264 format or a MPEG4 format, so as to generate video quality of the compressed data stream.

The mobile terminal 101 may compress the audio signal through an audio compressing chip to perform hard compression. The mobile terminal 101 may compress the audio signal with a processor (e.g., a CPU) to perform soft compression. For the soft compression, the mobile terminal 101 includes a soft compressing module which stores instructions to execute the soft compression. The instructions in the soft compressing module cause a processor of the mobile terminal 101 to compress the audio signal. The mobile terminal 101 may compress the audio signal to obtain the data streaming with an ADPCM format or a MP3 format.

The mobile terminal 101 may compress the video signal through a video compressing chip. The mobile terminal 101 may alternatively compress the video signal in a manner of soft compression. If the video compressing chip is used for compressing the video signal, power consumption and CPU resource of the mobile terminal 101 may be saved, and compression speed is improved.

According to various embodiments, the mobile terminal 101 packages the compressed audio signal and the compressed video signal to the data stream through the processor (e.g. the CPU). The data stream can be directly played in a terminal device to receive the data stream from the live server. The live server does not need to process the data stream. The mobile terminal 101 further includes a packaging module which stores instructions to execute a packaging operation. The instructions in the packaging module cause the processor of the mobile terminal 101 to package the compressed audio signal and the compressed video signal to the data stream. In the data stream, the compressed video signal is synchronized with the compressed audio signal.

The process of compressing the audio signal and the video signal and packaging the compressed audio signal and the compressed video signal into the data stream by the mobile terminal 101 includes the procedure as follows.

Various formats exist for the data stream, including, but not limited to, a FLV format, a RTP format, a TS format, or a customized format. In various embodiments, a FLV format is adopted. Thus, the data stream of the FLV format can be directly played on a computing device, e.g., a PC, through a flash player, and there is no need to perform format conversion at a transmitting side or at a receiving side.

Collected audio data (e.g., audio PCM data) is compressed to generate an audio frame. According to various embodiments, software compression may be adopted to generate the audio frame. After the audio data is collected, through audio compression encoding, the compressed audio data is obtained. Thus, the format of the compressed audio data can be varied. For example, the audio data can be compressed into the audio frame with a format such as mp3, mp2, etc. Moreover, high audio compression ratio can be obtained. In another example, hardware compression may be adopted to generate the audio frame.

According to various embodiments, the video frame may be obtained through a video compression chip in the mobile terminal 101. H.264 may be adopted to obtain the video frame. MPEG4 may also be adopted to obtain the video frame. After obtaining the compressed audio frame and the compressed video frame, a present time stamp (PTS) is added. Thereafter, a composite stream of audio and video with the FLV format is generated through a FLV multiplexer. In another example, software compression may be adopted to compress the video data.

When the audio frame and the video frame are packaged, PTSs are respectively added into the audio frame and the video frame for synchronizing audio and video. The PTS of the audio data of the audio frame is determined according to the time the audio data of the audio frame is collected. The PTS of the video data of the video frame is determined according to the time that the video data of the video frame is collected. For example, if the audio data of the audio frame is collected at 10:11:05:100, the PTS of the audio data of the audio frame is 10:11:05:100. If the video data of the video frame is collected at 10:11:05:120, the PTS of the audio data in the audio frame is 10:11:05:100. Thus, it is ensured that the audio is synchronized with the video when a composite stream of the audio and the video is played.

The process of packaging the audio data and the video data into a data stream of another format, e.g., TS, RTP, is similar with the process of packaging the audio data and the video data into the data stream of the FLV format, and is not repeated herein.

Figure 2:
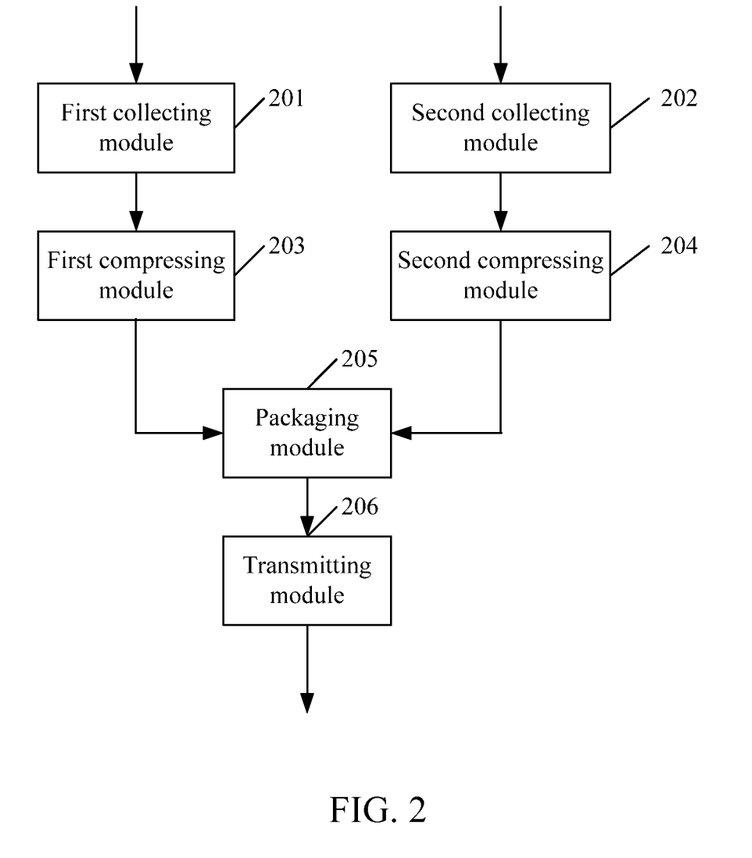
FIG. 2 is a diagram illustrating a structure of a mobile terminal according to various embodiments.

FIG. 2 is a diagram illustrating a structure of a mobile terminal according to various embodiments of the present disclosure. As shown in FIG. 2, the mobile terminal includes a first collecting module 201, a second collecting module 202, a first compressing module 203, a second compressing module 204, a packaging module 205, and a transmitting module 206. The first collecting module 201 collects a video signal. The second collecting module 202 collects an audio signal. The first compressing module 203 compresses the video signal. The second compressing module 204 compresses the audio signal. The packaging module 205 packages the video signal compressed through the first compressing instruction and the audio signal compressed through the second compressing instruction into a data stream. The transmitting module 206 transmits the data stream to a live server, wherein the data stream can be directly played in a terminal device to receive the data stream from the live server.

The first compressing module 203 compresses the audio signal through an audio compression chip or through a central processing unit. The second compressing module 204 compresses the video signal through a video compression chip or through software compression. The first collecting module 201 further records a time at which the audio signal is collected. The second collecting module 202 records a time at which the video signal is collected. The first compressing module 203 further adds the time at which the audio signal is collected into the compressed audio signal as a present time stamp of the compressed audio signal. The second compressing module 204 further adds the time at which the video signal is collected into the compressed video signal as a present time stamp of the compressed video signal.

The packaging module 205 packages the compressed video frame including the present time stamp of the compressed video signal and the compressed audio frame including the present time stamp of the compressed audio signal into the data stream. The packaging module 205 packages the video signal compressed by the first compressing module 203 and the audio signal compressed by the second compressing module 204 into the data stream of a FLV format.

The first compressing module 203 compresses the video signal to obtain a data stream with a H.264 format or a MPEG4 format through a video compression chip.

Figure 3:
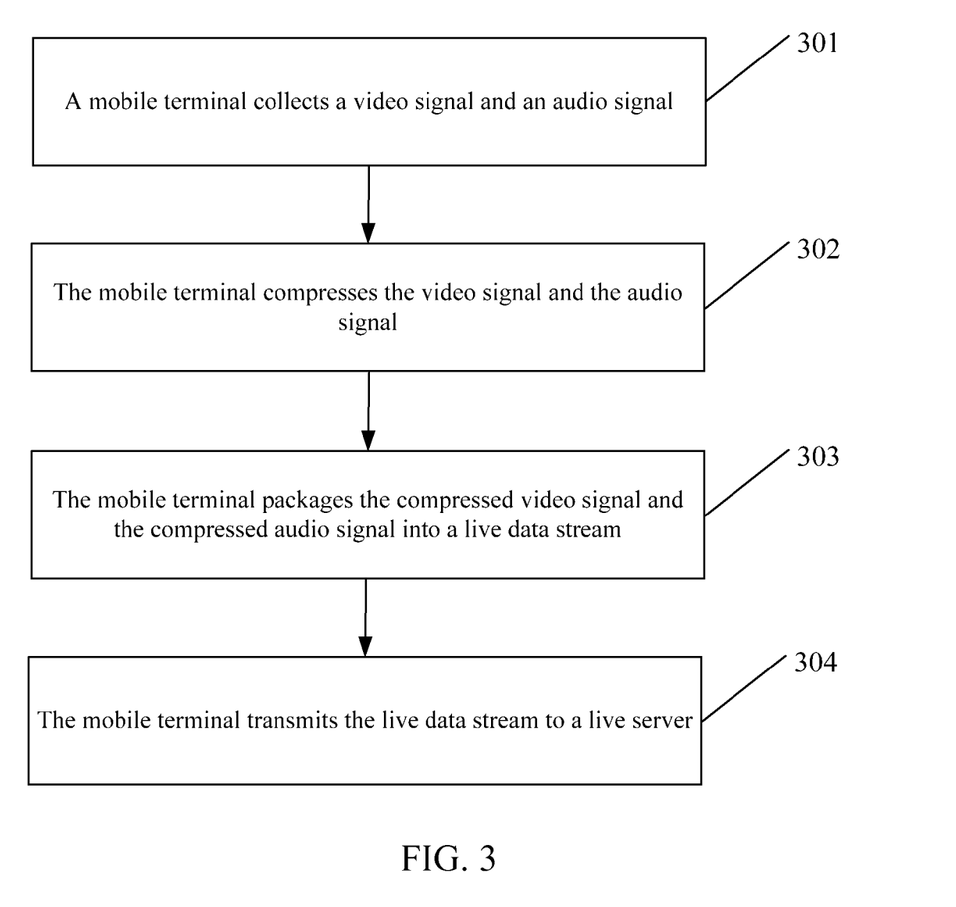
FIG. 3 is a flowchart illustrating a live method based on a mobile terminal according to various embodiments.

FIG. 3 is a flowchart illustrating a live method based on a mobile terminal according to various embodiments of the present disclosure.

Block 301: The mobile terminal collects a video signal and an audio signal. The process of collecting the video signal and the audio signal is similar to that of the live system based on a mobile terminal as recited above, and is not repeated herein.

Block 302: The mobile terminal compresses the video signal and the audio signal. The process of compressing the video signal and the audio signal is similar to that of the live system based on a mobile terminal as recited above and is not repeated herein.

Block 303: The mobile terminal packages the compressed video signal and the compressed audio signal into a data stream, wherein the data stream can be directly played in a terminal device to receive the data stream from the live server. The process of packaging the compressed video signal and the compressed audio signal into the data stream is similar to that of the live system based on a mobile terminal as recited above and is not repeated herein.

Block 304: The mobile terminal transmits the data stream to a live server. The process of transmitting the data stream to a live server is similar to that of the live system based on a mobile terminal as recited above and is not repeated herein.

Figure 4:
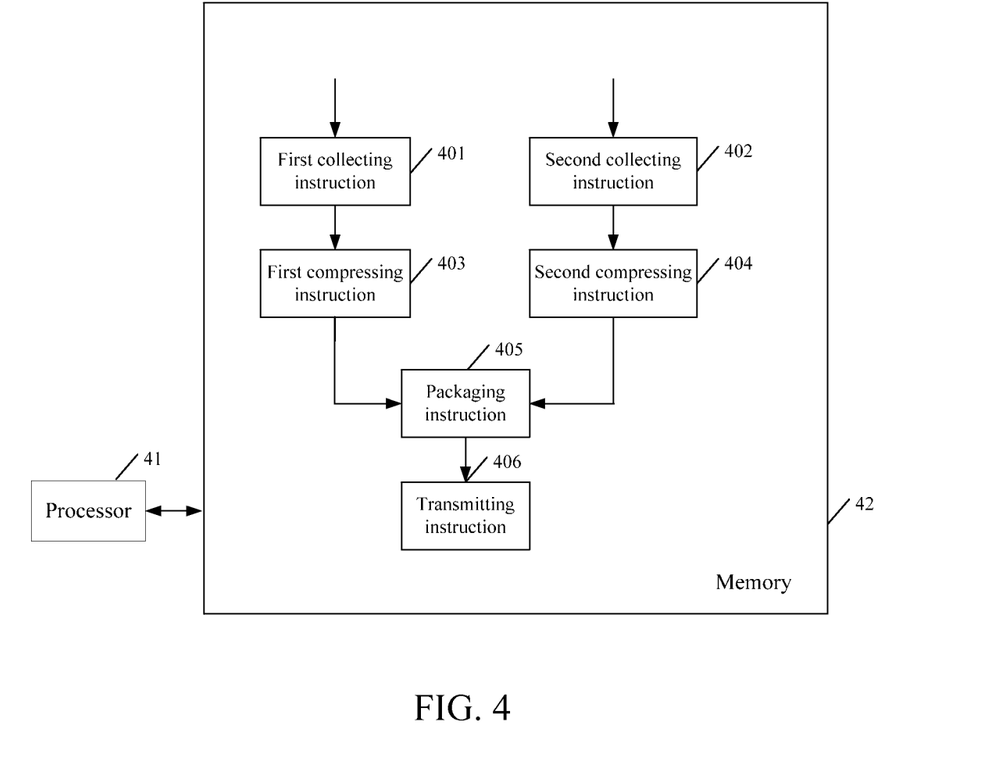
FIG. 4 is a diagram illustrating a structure of a mobile terminal according to various embodiments.

FIG. 4 is a diagram illustrating a mobile terminal according to various embodiments of the present disclosure. As shown in FIG. 4, the mobile terminal includes a processor 41 for executing instructions stored in a memory 42. The instructions include a first collecting instruction 401, a second collecting instruction 402, a first compressing instruction 403, a second compressing instruction 404, a packaging instruction 405, and a transmitting instruction 406.

The first collecting instruction 401 collects a video signal. The second collecting instruction 402 collects an audio signal. The first compressing instruction 403 compresses the video signal. The second compressing instruction 404 compresses the audio signal. The packaging instruction 405 packages the video signal compressed through the first compressing instruction 403 and the audio signal compressed through the second compressing instruction 404 into a data stream. The transmitting instruction 406 transmits the data stream to a live server, wherein the data stream can be directly played in a terminal device to receive the data stream from the live server.

The first compressing instruction 403 compresses the audio signal through an audio compression chip or through a central processing unit. The second compressing instruction 404 compresses the video signal through a video compression chip or through software compression. The first collecting instruction 401 further records a time at which the audio signal is collected. The second collecting instruction 402 record a time at which the video signal is collected. The first compressing instruction 403 further adds the time at which the audio signal is collected into the compressed audio signal as a present time stamp of the compressed audio signal. The second compressing instruction 404 further adds the time at which the video signal is collected into the compressed video signal as a present time stamp of the compressed video signal.

The packaging instruction 405 packages the compressed video frame including the present time stamp of the compressed video signal and the compressed audio frame including the present time stamp of the compressed audio signal into the data stream. The packaging instruction 405 packages the video signal compressed by the first compressing instruction and the audio signal compressed by the second compressing instruction into the data stream of a FLV format.

The first compressing instruction 403 compresses the video signal to obtain a data stream with a H.264 format or a MPEG4 format through a video compression chip.

According to a technical method provided by the present disclosure, a mobile terminal, e.g., a smartphone, collects an audio signal and a video signal, compresses the audio signal and the video signal, packages the compressed audio signal and the compressed video signal into a data stream, and transmits the data stream to a network device (e.g. a live server) via a wireless network or the Internet, e.g., 3G, 4G, Wi-Fi. The network device transmits the data stream to a live terminal via a CDN network, wherein the data stream can be directly played in the live terminal. Thus, a user of the live terminal can watch a real-time live video program. Since professional studio cameras and large studio vehicles are not configured for a live broadcast, cost of the live broadcast can be reduced.

Moreover, since the mobile terminal (e.g., a smartphone) and the wireless network (e.g. Wi-Fi, 3G) are becoming increasingly popular, the real-time requirement for a live broadcast is improved.

In addition, according to various embodiments of the present disclosure, a video compression chip is adopted to compress a video signal. Thus, compression speed of compressing the video signal is improved and power consumption and CPU resource of the mobile terminal is saved.

According to various embodiments of the present disclosure, both a PTS of the audio signal and a PTS of the video signal are determined, and the audio signal and the video signal can be packaged into the data stream. The video signal is synchronized with the audio signal to achieve a desirable live effect.

The foregoing is preferred examples of the present disclosure and is not used to limit the protection scope of the present disclosure. Any modification, equivalent substitution, and improvement without departing from the spirit and principle of the present disclosure are within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more processes within a method may be executed in different order (or concurrently) without altering the principles of the present disclosure.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A system for performing a living broadcast based on a mobile terminal, comprising:
a mobile terminal, to collect a video signal and an audio signal, compress the video signal and the audio signal, record a time of collecting the audio signal and record a time of collecting the video signal, add the time of collecting the audio signal into the compressed audio signal as a present time stamp of the compressed audio signal, add the time of collecting the video signal into the compressed video signal as a present time stamp of the compressed video frame, package the compressed video signal including the present time stamp of the compressed video signal and the compressed audio signal including the present time stamp of the compressed audio signal into a data stream of a FLV format, adding geographical position information into the data stream, transmit the data stream to a live server; and
the live server, to transmit the data stream to a terminal device, wherein the data stream can be directly played in the terminal device.

2. The system of claim 1, wherein the mobile terminal is to compress the audio signal through an audio compression chip or through a central processing unit;
the mobile terminal is to compress the video signal through a video compression chip or through software compression.

3. The system of claim 1, the mobile terminal is further to activate a camera to collect the video signal, and activate a microphone to collect the audio signal.

4. The system of claim 1, the mobile terminal is to package the compressed audio signal and the compressed video signal to the data stream through a central processing unit.

5. The system of claim 1, wherein the compressed video signal comprises a data stream of a H.264 format, or a data stream of a MPEG4.

6. The system of claim 1, the live server is to transmit the data stream to a terminal device through a wireless network or an internet.

7. A method for performing a living broadcast based on a mobile terminal, comprising:
collecting, by a mobile terminal, a video signal and an audio signal;
compressing, by the mobile terminal, the video signal and the audio signal;
recording, by the mobile terminal, a time of collecting the video signal;
adding, by the mobile terminal, the time of collecting the audio signal into the compressed audio signal as a present time stamp of the compressed audio signal;
adding, by the mobile terminal, the time of collecting the video signal into the compressed video signal as a present time stamp of the compressed video signal;
packaging, by the mobile terminal, the compressed video signal including the present time stamp of the compressed video signal and the compressed audio signal including the present time stamp of the compressed audio signal into a data stream of a FLV format, adding geographical position information into the data stream; and
transmitting, by the mobile terminal, the data stream to a live server, wherein the data stream can be directly played in a terminal device to receive the data stream from the live server.

8. The method of claim 7, wherein compressing the video signal and the audio signal comprises:
compressing, by the mobile terminal, the audio signal through an audio compression chip or through a central processing unit;
compressing, by the mobile terminal, the video signal through a video compression chip or through software compression.

9. A mobile terminal, comprising:
a processor for executing instructions stored in a memory, the instructions comprise:
a first collecting instruction, to collect a video signal, record a time of collecting the audio signal;
a second collecting instruction, to collect an audio signal, record a time of collecting the video signal;
a first compressing instruction, to compress the video signal, add the time of collecting the audio signal into the compressed audio signal as a present time stamp of the compressed audio signal;
a second compressing instruction, to compress the audio signal, add the time of collecting the video signal into the compressed video signal as a present time stamp of the compressed video signal; and
a packaging instruction, to package the compressed video signal including the present time stamp of the compressed video signal through the first compressing instruction and the compressed audio signal including the present time stamp of the compressed audio signal through the second compressing instruction into a data stream of a FLV format, adding geographical position information into the data stream; and a transmitting instruction, to transmit the data stream to a live server, wherein the data stream can be directly played in a terminal device to receive the data stream from the live server.

10. The mobile terminal of claim 9, wherein the first compressing instruction is to compress the audio signal through an audio compression chip or through a central processing unit;

the second compressing instruction is to compress the video signal through a video compression chip or through software compression.

11. The mobile terminal of claim 9, wherein the first compressing instruction is to compress the video signal to obtain a data stream with a H.264 format or a MPEG4 format through a video compression chip.

* * * * *